(12) United States Patent
Son et al.

(10) Patent No.: US 12,473,507 B2
(45) Date of Patent: Nov. 18, 2025

(54) SOLVATED METAL PARTICLE-COATING SYSTEM AND METHOD

(71) Applicant: Purdue Research Foundation, West Lafayette, IN (US)

(72) Inventors: Steven F. Son, West Lafayette, IN (US); Caleb Nathaniel Harper, Omaha, NE (US); Ryan Tolman Merrell, West Lafayette, IN (US); Andrew Ryan Noel, Granbury, TX (US); Dhruval Natubhai Patel, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

(21) Appl. No.: 18/205,032

(22) Filed: Jun. 2, 2023

(65) Prior Publication Data
US 2024/0093109 A1    Mar. 21, 2024

Related U.S. Application Data

(60) Provisional application No. 63/348,056, filed on Jun. 2, 2022.

(51) Int. Cl.
*C10L 5/40*    (2006.01)
*B22F 1/10*    (2022.01)
(Continued)

(52) U.S. Cl.
CPC .................... *C10L 5/40* (2013.01); *B22F 1/10* (2022.01); *B22F 1/145* (2022.01); *B22F 1/17* (2022.01);
(Continued)

(58) Field of Classification Search
CPC .... B22F 1/10; B22F 1/145; B22F 1/17; B22F 2301/052; B22F 2301/054; B22F 2998/10; C10L 5/40; C10L 2290/20
See application file for complete search history.

(56) References Cited

U.S. PATENT DOCUMENTS

| 6,473,048 B1 * | 10/2002 | Diaz | H01Q 1/42 343/753 |
| 2004/0001299 A1 * | 1/2004 | van Haaster | H05K 9/0088 257/E23.114 |
| 2014/0339479 A1 * | 11/2014 | Koike | B22F 1/17 252/514 |

OTHER PUBLICATIONS

Schindewolf, U. Formation and Properties of Solvated Electrons. Agnew. Chem. Internat. Edit. vol. 7 (1968), No. 3.
(Continued)

*Primary Examiner* — James C Goloboy
(74) *Attorney, Agent, or Firm* — Purdue Research Foundation

(57) ABSTRACT

The solvated metal particle-coating system includes a metal additive and a polar outer-sphere electron transferring solvent. The metal additive is solvated in the polar outer-sphere electron transferring solvent. The polar outer-sphere electron transferring solvent may include liquid ammonia, methylamine, and/or hexamethylphosphoramide. The metal additive may include an alkali metal and/or an alkaline earth metal. The solvated metal additive within the polar outer-sphere electron transferring solvent may be used to coat a metal particle and/or a metalloid particle as a layer. As the polar outer-sphere electron transferring solvent evaporates, the solvated metal additive is coupled to the metal particle and/or the metalloid particle.

8 Claims, 3 Drawing Sheets

Figure 1:
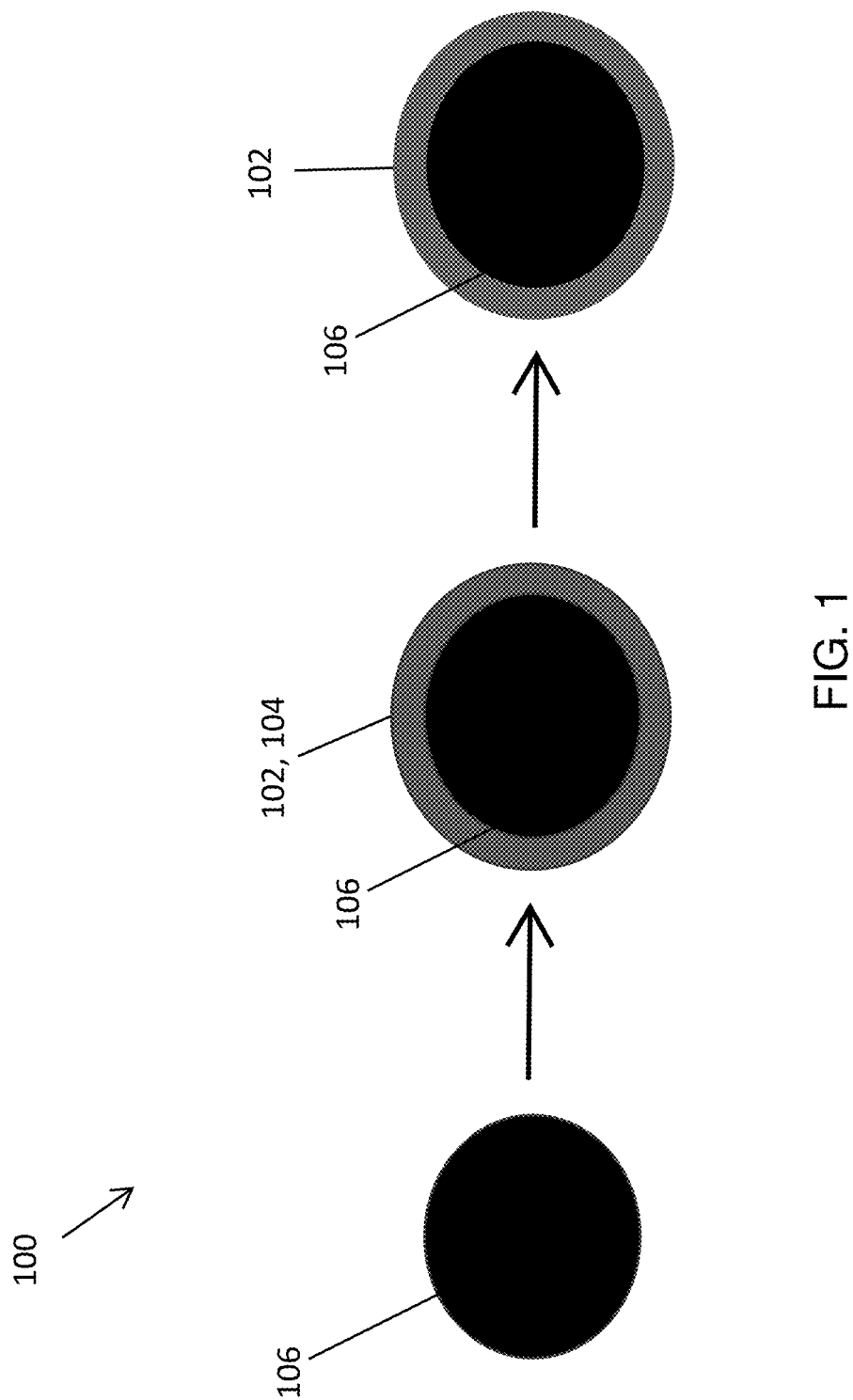

(51) Int. Cl.
*B22F 1/145* (2022.01)
*B22F 1/17* (2022.01)

(52) U.S. Cl.
CPC ... *B22F 2301/052* (2013.01); *B22F 2301/054* (2013.01); *B22F 2998/10* (2013.01); *C10L 2290/20* (2013.01)

(56) References Cited

OTHER PUBLICATIONS

Lagowski, J. J., Solution Phenomena in Liquid Ammonia. Pure and Applied Chemistry, (1971), vol. 25, No. 2, pp. 429-456.
Zurek, E. et al., A Molecular Perspective on Lithium-Ammonia Solutions. Agnew. Chem. Int. Ed. (2009), 48, pp. 8198-8232.

* cited by examiner

SOLVATED METAL PARTICLE-COATING SYSTEM AND METHOD

CROSS REFERENCE TO RELATED APPLICATIONS

The present application is a U.S. non-provisional application which claims the benefit of U.S. provisional application Ser. No. 63/348,056, filed Jun. 2, 2022, the content of which is incorporated by reference herein in its entirety.

GOVERNMENT SUPPORT CLAUSE

This invention was made with government support under W911NF2020189 awarded by the United States Army. The government has certain rights in the invention.

FIELD

The disclosure generally relates to combustion systems and, more particularly, to metal/metalloid combustion systems.

INTRODUCTION

This section provides background information related to the present disclosure which is not necessarily prior art.

More sustainable green energy alternatives are needed to address the increasing global pollution caused by fossil fuel emissions. As part of this effort, the United Nations General Assembly has proposed an agenda to double global energy efficiency and disseminate greener energy sources worldwide by the year 2030.

In accordance with this agenda and to address the global pollution issue, numerous methods of generating more sustainable green energy have been proposed and attempted. Several of these methods, namely wind, solar, nuclear, and hydroelectric power show promise, but are ultimately limited by our ability to efficiently store and transport the energy produced for later use. A solution to this problem is through the use of energy carriers that can optimize the complex interaction between supply and demand chains. However, current "green" energy carriers, such as batteries, have poor gravimetric and volumetric energy densities compared to fossil fuels. This poor energy density inherent in modern batteries poses a challenge to replace fossil fuels and is one of the principal obstacles preventing the use and production of battery-powered aircraft.

To continue to maintain the world's increasing energy demands while simultaneously decreasing global atmospheric pollution, the search for more efficient and energy dense fuels is needed. Fuel sources, such as metal particles and metalloid particles, have largely been unsuccessful due to their poor reaction properties. Specifically, the metal/metalloid particles typically have difficulty burning due to an inhibiting oxide layer on the surface of the particle. The metal/metalloid particles are expected to provide a suitable fuel source for many applications, however, the reaction properties of metal/metalloid particles inhibit their use for such needs. Known methods of applying metal additives to less reactive metal/metalloid particles include reactions and forces such as ball-milling. Such processes may be too time consuming and inefficient for large scale applications and manufacturing.

Accordingly, there is a continuing need for a more efficient and energy dense fuel that maintains combustion and militates against flame-out conditions. Desirably, the more efficient and energy dense fuel may also militate against global pollution.

SUMMARY

In concordance with the present disclosure, a combustion system that provides a more efficient and energy dense fuel source that maintains combustion and militates against flame-out conditions, has surprisingly been discovered. Desirably, the combustion system may also militate against global pollution.

A solvated metal particle-coating system may include a combustion system coupled to one of a metal particle and/or a metalloid particle. The combustion system may include a metal additive and a polar outer-sphere electron transferring solvent. The metal additive is solvated in the polar outer-sphere electron transferring solvent. In a specific example, the metal additive may be solvated in the polar outer-sphere electron transferring solvent via simple dissolution, chemical radiation, or electrolysis. By dissolving the metal additive within the polar outer-sphere electron transferring solvent, the metallic-bonding system of metal additive may be uniquely combined with the covalent bonding system of the polar outer-sphere electron transferring solvent. The polar outer-sphere electron transferring solvent may include liquid ammonia, methylamine, and/or hexamethylphosphoramide. The metal additive may include an alkali metal and/or an alkaline earth metal. More specifically, the metal additive may include lithium, aluminum, zirconium, titanium, yttrium, hafnium, and/or magnesium. The solvated metal additive and the polar outer-sphere electron transferring solvent may be used to coat the metal particle and/or a metalloid particle as a layer. The polar outer-sphere electron transferring solvent may then be evaporated, leaving the metal additive coupled to the metal particle and/or the metalloid particle. In a specific example, the metal additive may include more energetically reactive properties than the metal particle and/or the metalloid particle.

Various ways of manufacturing the solvated metal particle-coating system are provided. For instance, a method may include a step of providing a polar outer-sphere electron transferring solvent. The method may also include a step of providing a metal additive. The metal additive may be dissolved within the polar outer-sphere electron transferring solvent. The metal additive dissolved within the polar outer-sphere electron transferring solvent may then be coated onto the metal/metalloid particle as a layer. Next, the polar outer-sphere electron transferring solvent may evaporate, thus leaving the metal additive coated onto the metal/metalloid particle. Without being bound to any particular theory, it is believed that coating the metal/metalloid particle with the metal additive enhances the combustion properties of the metal/metalloid particle. Advantageously, the metal additive may be more efficiently coupled to the metal/metalloid particle by particle coating the solvated metal additive within the polar outer-sphere electron transferring solvent and allowing the polar outer-sphere electron transferring solvent to evaporate away. One skilled in the art may select other suitable ways of manufacturing the combustion system, within the scope of the present disclosure.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

Figure 2:
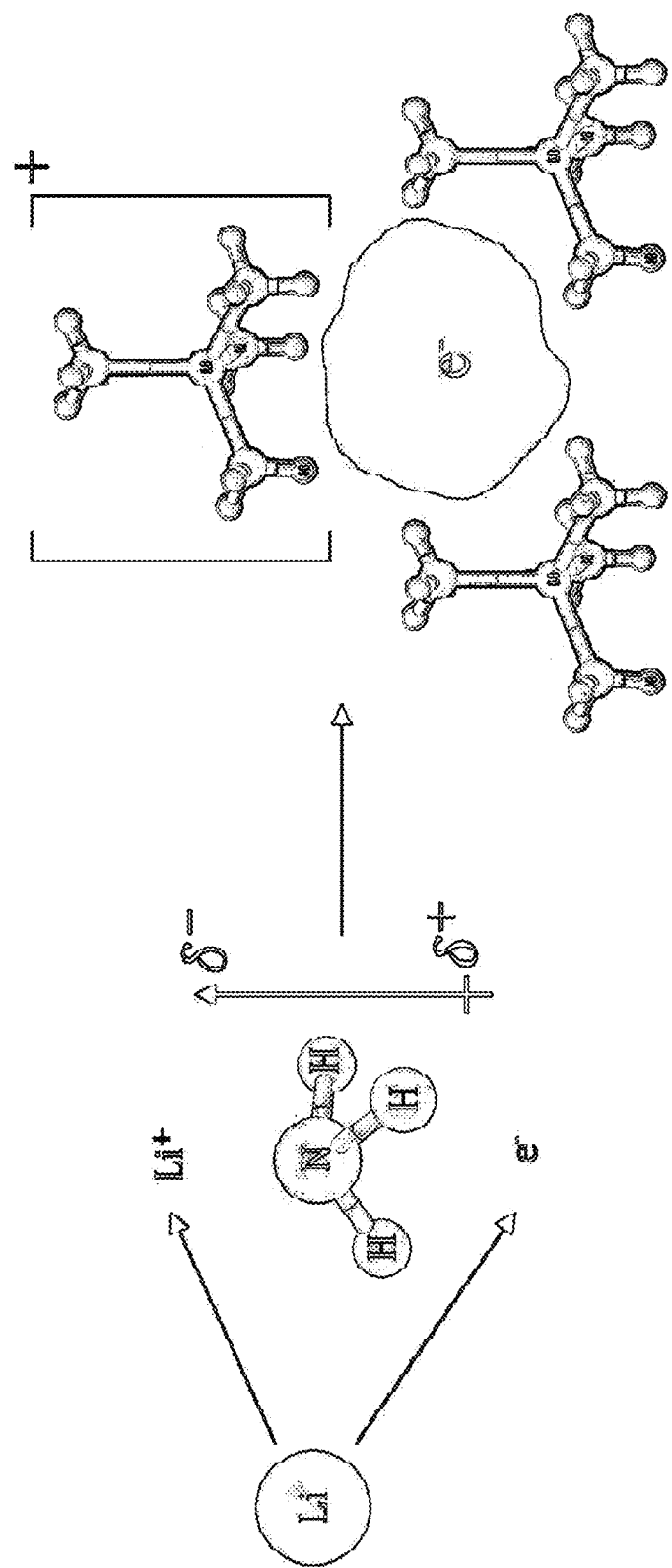
Figure 3:
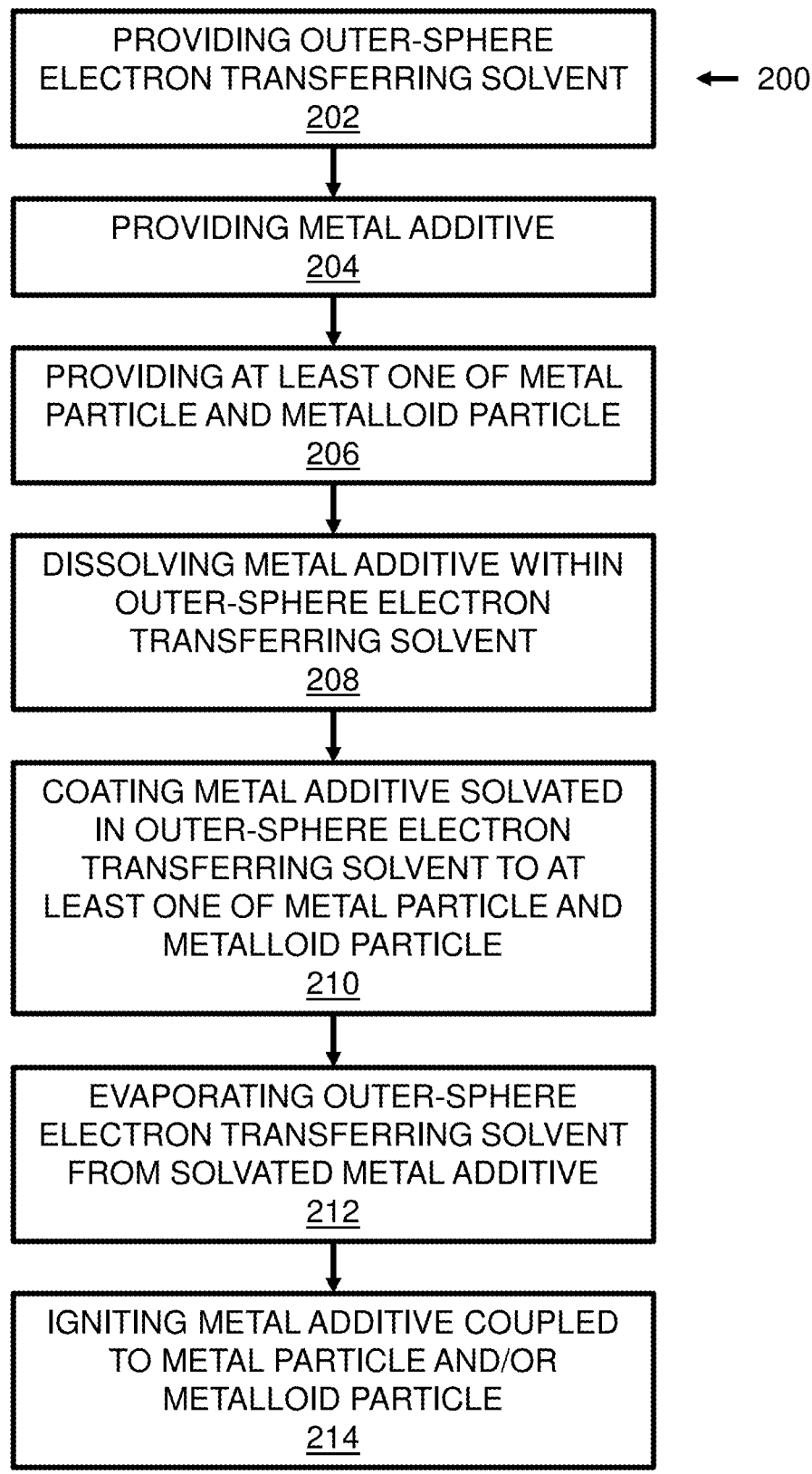

FIG. 1 is a schematic diagram illustrating the solvated metal particle-coating system, further depicting a metal particle being coated with a combustion system having a metal additive and a polar outer-sphere electron transferring solvent, which then has the polar outer-sphere electron transferring solvent evaporated therefrom, thus leaving the metal additive coated on the metal particle, according to one embodiment of the present disclosure;

FIG. 2 is a schematic diagram of a solvation process for the combustion system, further depicting a quasi-free electron of lithium dissolving into solution, according to one embodiment of the present disclosure; and FIG. 3 is a flowchart of a method for manufacturing the solvated metal particle-coating system, according to one embodiment of the present disclosure.

DETAILED DESCRIPTION

The following description of technology is merely exemplary in nature of the subject matter, manufacture, and use of one or more inventions, and is not intended to limit the scope, application, or uses of any specific invention claimed in this application or in such other applications as may be filed claiming priority to this application, or patents issuing therefrom. Regarding methods disclosed, the order of the steps presented is exemplary in nature, and thus, the order of the steps can be different in various embodiments, including where certain steps can be simultaneously performed. "A" and "an" as used herein indicate "at least one" of the item is present; a plurality of such items may be present, when possible. Except where otherwise expressly indicated, all numerical quantities in this description are to be understood as modified by the word "about" and all geometric and spatial descriptors are to be understood as modified by the word "substantially" in describing the broadest scope of the technology. "About" when applied to numerical values indicates that the calculation or the measurement allows some slight imprecision in the value (with some approach to exactness in the value; approximately or reasonably close to the value; nearly). If, for some reason, the imprecision provided by "about" and/or "substantially" is not otherwise understood in the art with this ordinary meaning, then "about" and/or "substantially" as used herein indicates at least variations that may arise from ordinary methods of measuring or using such parameters.

Although the open-ended term "comprising," as a synonym of non-restrictive terms such as including, containing, or having, is used herein to describe and claim embodiments of the present technology, embodiments may alternatively be described using more limiting terms such as "consisting of" or "consisting essentially of." Thus, for any given embodiment reciting materials, components, or process steps, the present technology also specifically includes embodiments consisting of, or consisting essentially of, such materials, components, or process steps excluding additional materials, components or processes (for consisting of) and excluding additional materials, components or processes affecting the significant properties of the embodiment (for consisting essentially of), even though such additional materials, components or processes are not explicitly recited in this application. For example, recitation of a composition or process reciting elements A, B and C specifically envisions embodiments consisting of, and consisting essentially of, A, B and C, excluding an element D that may be recited in the art, even though element D is not explicitly described as being excluded herein.

As referred to herein, disclosures of ranges are, unless specified otherwise, inclusive of endpoints and include all distinct values and further divided ranges within the entire range. Thus, for example, a range of "from A to B" or "from about A to about B" is inclusive of A and of B. Disclosure of values and ranges of values for specific parameters (such as amounts, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that Parameter X may have a range of values from about A to about Z. Similarly, it is envisioned that disclosure of two or more ranges of values for a parameter (whether such ranges are nested, overlapping, or distinct) subsume all possible combination of ranges for the value that might be claimed using endpoints of the disclosed ranges. For example, if Parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, 3-9, and so on.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the FIG. is turned over, elements described as "below," or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

As shown in FIG. 1, the solvated metal particle-coating system 100 may include a combustion system 102, 104 coupled to one of a metal particle and/or a metalloid particle 106. The combustion system 102, 104 may include a metal additive 102 and a polar outer-sphere electron transferring solvent 104. The metal additive 102 may be solvated in the polar outer-sphere electron transferring solvent 104. In a specific example, the metal additive 102 may be solvated in the polar outer-sphere electron transferring solvent 104 via simple dissolution, chemical radiation, or electrolysis. By dissolving the metal additive 102 within the polar outer-sphere electron transferring solvent 104, the metallic-bonding system of metal additive 102 may be uniquely combined with the covalent bonding system of the polar outer-sphere electron transferring solvent 104. The polar outer-sphere electron transferring solvent 104 may include liquid ammonia, methylamine, and/or hexamethylphosphoramide. The metal additive 102 may include an alkali metal and/or an alkaline earth metal. More specifically, the metal additive 102 may include lithium, sodium, aluminum, zirconium, titanium, yttrium, hafnium, and/or magnesium. The metal additive 102 and the polar outer-sphere electron transferring solvent 104 may include various other materials and/or components, within the scope of the present disclosure. The solvated metal additive 102 and the polar outer-sphere electron transferring solvent 104 may be used to coat the metal particle and/or a metalloid particle 106 as a layer. The polar outer-sphere electron transferring solvent 104 may then be evaporated, leaving the metal additive 102 coupled to the metal particle and/or the metalloid particle 106. In other words, the solvated metal additive 102 may be coupled to the metal particle and/or the metalloid particle 106 via a wet particle coating process. In a specific example, the metal additive 102 may include more energetically reactive properties than the metal particle and/or the metalloid particle 106. In other words, the solvated metal additive 102 and the polar outer-sphere electron transferring solvent may advantageously provide a shell of a reactive metal over the metal particle and/or the metalloid particle 106 in cases where the metal particle and/or the metalloid particle 106 need to be more reactive to encourage a sustained combustion. For instance, where the metal particle and/or the metalloid particle 106 is boron, a coating of the solvated metal additive 102 and the polar outer-sphere electron transferring solvent 104 may enhance the combustion of the metal particle and/or the metalloid particle 106. Another desirable application of the solvated metal particle-coating system 100 is to provide a passive coating to militate against oxidation. For instance, where the metal particle and/or the metalloid particle 106 is an aluminum-lithium alloy, a coating of the solvated metal additive 102 and the polar outer-sphere electron transferring solvent 104 may militate against the oxidation of the metal particle and/or the metalloid particle 106.

The metal additive 102 may be coupled to the metal particle and/or the metalloid particle 106 in various ways. Provided as a non-limiting example, the metal additive 102 may be coated onto the metal particle and/or the metalloid particle 106 in a crystalline form. In a specific example, the metal additive solvated in the polar outer-sphere electron transferring solvent may be sprayed onto the metal particle and/or the metalloid particle 106. In another specific example, the metal additive solvated in the polar outer-sphere electron transferring solvent may be tumble coated onto the metal particle and/or the metalloid particle 106. A skilled artisan may select other suitable ways to couple the metal additive 102 to the metal particle and/or the metalloid particle 106, within the scope of the present disclosure.

In certain circumstances, a solvated electron solution may be formed by dissolving the metal additive 102 within the polar outer-sphere electron transferring solvent 104. Solvated electrons are quasi-free electrons in solution and are the smallest possible anion. In the present disclosure, solvated electrons may be formed in solvents that exhibit outer-sphere electron transfer via radiation chemistry, electrolysis, and/or by simple dissolution of specific metals. A skilled artisan may select other suitable ways to provide the solvated electron, within the scope of the present disclosure.

The simplest representation of the solvated electron in liquid anhydrous ammonia (LAA) takes the general form:

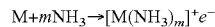

Where M is a soluble metal and e⁻ is a quasi-free electron dissolved into solution. Depending on the solvated metal, a stable number of ammonia molecules (denoted m) will coordinate with the metal cation to form a complex. Provided as a non-limiting example, in the case of lithium, four ammonia molecules coordinating with one lithium cation may give the most stable coordination. With continued reference to the non-limiting example, a simplification of the solvation process of lithium in liquid anhydrous ammonia is shown in FIG. 2.

In reality, the number of solvated states is quite complex, with each state having unique physical and chemical properties. Due to the reactive nature of many of these solvation states, the solution slowly reacts with itself to form a metal amide:

Despite this side reaction, solvated electron solutions can be stable for days, depending on the and solute.

In certain circumstances, particular solvation states may occur based on the characteristics of the polar outer-sphere electron transferring solvent 104 and/or the metal additive 102. For instance, where ammonia may finish evaporating during a drying phase of particle coating, the following solvation state may begin to dominate:

When ammonia concentrations decrease even further, [Li(NH₃)₄]ᵣ crashes out of solution as a crystalline solid. Upon further evaporation, solid lithium is left behind. Overall, the evaporation process occurs as follows:

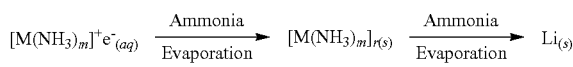

Various ways of manufacturing the solvated metal particle-coating system 100 are provided. For instance, as shown in FIG. 3, a method 200 may include a step 202 of providing a polar outer-sphere electron transferring solvent 104. The method 200 may also include a step 204 of providing a metal additive 102. The metal additive 102 may be dissolved within the polar outer-sphere electron transferring solvent 104. The metal additive 102 dissolved within the polar outer-sphere electron transferring solvent 104 may then be coated onto the metal/metalloid particle 106 as a layer. Next, the polar outer-sphere electron transferring solvent 104 may evaporate, thus leaving the metal additive 102 coated onto the metal/metalloid particle 106. In a specific example, the method 200 may also include igniting the metal additive coupled to the metal particle and/or the metalloid particle after evaporating the polar outer-sphere electron transferring solvent. Without being bound to any particular theory, it is believed that coating the metal/metalloid particle 106 with the metal additive 102 enhances the combustion properties of the metal/metalloid particle 106. Advantageously, the metal additive 102 may be more efficiently coupled to the metal/metalloid particle 106 by particle coating the solvated metal additive 102 within the polar outer-sphere electron transferring solvent 104 and allowing the polar outer-sphere electron transferring solvent 104 to evaporate away. It should be appreciated that the order of the steps of the method may be rearranged to provide the solvated metal particle-coating system 100. One skilled in the art may select other suitable ways of manufacturing the solvated metal particle-coating system 100, within the scope of the present disclosure.

Advantageously, the solvated metal particle-coating system 100 may provide a more efficient and energy dense fuel source that maintains combustion by providing temporary oxidation protection of the metal additive 102, militates against flame-out conditions, and is less toxic than known combustion materials such as hydrazine. Desirably, the solvated metal particle-coating system 100 may also militate against global pollution. For instance, in a specific example, the solvated metal particle-coating system 100 may produce zero-carbon emissions.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. Equivalent changes, modifications and variations of some embodiments, materials, compositions, and methods can be made within the scope of the present technology, with substantially similar results.

What is claimed is:

1. A method of manufacturing a solvated metal particle-coating system, the method comprising the steps of:
   providing a polar outer-sphere electron transferring solvent;
   providing a metal additive;
   providing at least one of a metal particle and a metalloid particle;
   dissolving the metal additive within the polar outer-sphere electron transferring solvent utilizing an electrolysis process;
   coating the metal additive solvated in the polar outer-sphere electron transferring solvent over the at least one of the metal particle and the metalloid particle; and
   evaporating the polar outer-sphere electron transferring solvent from the solvated metal additive, thus leaving the metal additive coated onto the at least one of the metal particle and the metalloid particle.

2. The method of claim 1, wherein the step of dissolving the metal additive within the polar outer-sphere electron transferring solvent utilizes a radiation chemistry process.

3. The method of claim 1, wherein the step of dissolving the metal additive within the polar outer-sphere electron transferring solvent includes a reaction having the formula:

$$M + mNH_3 \rightarrow [M(NH_3)_m]^+ e^-.$$

4. The method of claim 1, wherein the metal additive solvated in the polar outer-sphere electron transferring solvent is coated onto the at least one of the metal particle and the metalloid particle in a crystalline form.

5. The method of claim 4, wherein the metal additive solvated in the polar outer-sphere electron transferring solvent is sprayed onto the at least one of the metal particle and the metalloid particle.

6. The method of claim 4, wherein the metal additive solvated in the polar outer-sphere electron transferring solvent is tumble coated onto the at least one of the metal particle and the metalloid particle.

7. The method of claim 1, wherein the polar outer-sphere electron transferring solvent is liquid anhydrous ammonia and the metal additive includes lithium.

8. The method of claim 1, further comprising a step of igniting the metal additive coupled to the at least one of the metal particle and the metalloid particle after the step of evaporating the polar outer-sphere electron transferring solvent.

* * * * *